Oct. 11, 1932.   G. R. POYER   1,882,092
CONNECTING ROD ASSEMBLY
Filed July 18, 1930
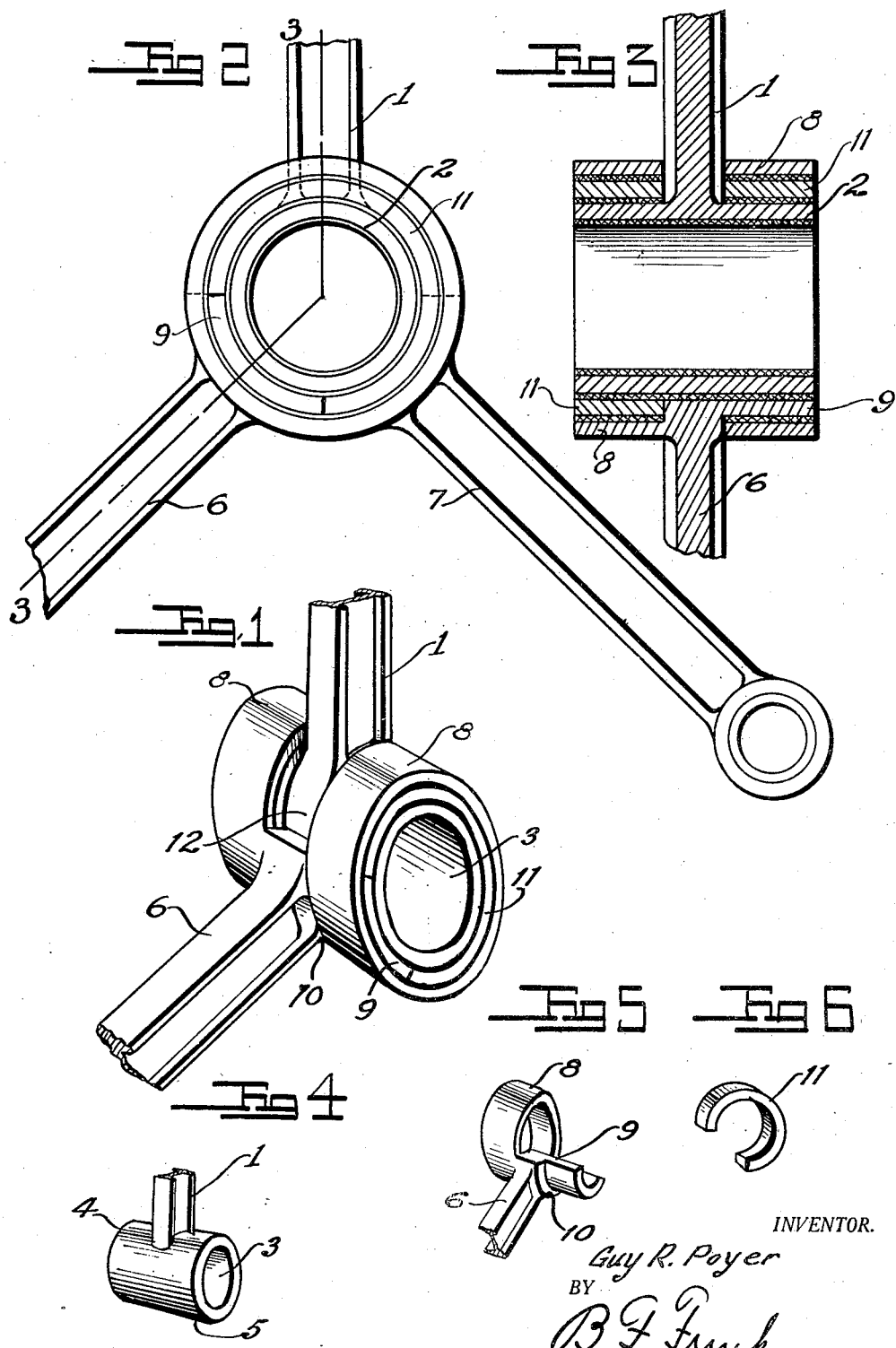
INVENTOR.
Guy R. Poyer
BY
B. F. Frink
ATTORNEY.

Patented Oct. 11, 1932

1,882,092

UNITED STATES PATENT OFFICE

GUY R. POYER, OF WICHITA, KANSAS

CONNECTING ROD ASSEMBLY

Application filed July 18, 1930. Serial No. 468,756.

This invention relates to a connecting rod assembly, particularly designed for radial piston internal combustion engines although the assembly is also adapted for use in connection with other types of radial piston engines.

The invention contemplates the provision of a connecting rod having an arbor upon which is mounted other connecting rods so that a compact assembly is provided.

The novelty of the invention will be understood by reference to the following description in connection with the accompanying drawing in which:

Figure 1 is a perspective view of the connecting rod assembly.

Figure 2 is an end view of the same.

Figure 3 is a sectional view on the line 3—3 of Figure 2.

Figure 4 is a perspective view of the arbor end of the main connecting rod.

Figure 5 is a detailed perspective view of one end of one of the supported connecting rods and Figure 6 is a detailed perspective view of one of the slip rings.

In carrying out my invention, I provide a main connecting rod 1 with an arbor 2 at one end having an opening 3, lined with babbit metal to receive the crank pin of the crank shaft. The connecting rod 1 has its rod portion between the ends of the arbor 2 to provide bearings 4 and 5 on opposite sides thereof.

Two complementary connecting rods 6 and 7 are supported by the arbor 2. Each complementary connecting rod is a duplicate of the other so it will be necessary to describe only one of them. Each complementary connecting rod carries a slip strap or ring 8 preferably lined with babbit metal. The slip strap consists of a ring offset with respect to the rod proper and projecting laterally from the ring at one end of the connecting rod is a segmental crow-foot or flange 9 provided with a shoulder 10 as illustrated in Figure 5. The slip strap is slipped over one end of the arbor with the crow-foot bearing against the arbor and extending over to the other end thereof. The third connecting rod is attached to the main connecting rod by slipping the slip strap over the other end with the crow-foot received in the slip strap of the other complementary connecting rod so that each crow-foot on each complementary connecting rod bears on the arbor of the main connecting rod and projects into the slip strap of the other complementary connecting rod. The segment comprising the crow-foot is less than a half circle, preferably a quadrant, and the shoulders 10 against which the ends of the slip straps bear prevent the ends of the slip straps from bearing against the main connecting rod.

After the parts are thus assembled, two slip rings 11 are inserted in the ends of the slip straps to fill the spaces within the slip straps between the ends of the crow-feet 9. Therefore, a uniform bearing is provided for each of the complementary connecting rods on the arbor.

The crank pin passes through the opening in the arbor and the cheeks of the crank shaft fit snugly enough against the end of the arbor to prevent the slip rings from displacement when the engine is operating. It is to be understood, of course, that the crank shaft is a sectional one so that it may be associated with the assembly but it is thought that it is unnecessary to illustrate the details of the crank shaft because it may take various forms without departing from the spirit of the invention.

Attention is called to the fact that the shoulders 10 on the complementary connecting rods maintain the slip straps in spaced relation so that there is a slot 12 provided between the slip straps to allow for play of the connecting rod 1. This will be apparent by reference to Figure 1.

From the foregoing it will be apparent that the connecting rod assembly is simple in construction and that it is quite compact for use with radial piston engines.

It is to be understood, of course, that the slip rings or members 11 fit loose enough in the arbor to permit them to oscillate with the crow-feet. In other words, the members 11 act as removable continuations of the crow-feet and are merely placed to act as spacers or inserts.

What I claim and desire to secure by Letters-Patent is:—

1. A connecting rod assembly comprising a connecting rod having an arbor at one end projecting from opposite sides thereof, complementary connecting rods having slip straps received on the ends of the arbor, each complementary connecting rod having a crow-foot resting on the arbor and positioned in the space between the arbor and the slip strap of its complementary connecting rod and slip rings in the space between the slip straps and the arbor not occupied by a crow foot.

2. A connecting rod assembly comprising a connecting rod having an arbor at one end, two complementary connecting rods, each having a slip strap at one end and a laterally projecting crow-foot, the slip straps of the rods fitting over the ends of the arbor of the first named connecting rod, the crow-foot of each complementary connecting rod being positioned in the space between the arbor and the slip strap of its complementary connecting rod, each crow-foot having a shoulder against which one end of a slip strap bears to maintain the slip straps in spaced relation and slip rings in the space between the slip straps and the arbor not occupied by a crow foot.

In testimony whereof I affix my signature.

GUY R. POYER.